V. H. KADISH.
METHOD OF RECOVERING FERTILIZING MATERIAL FROM TANNERY WASTE LIQUIDS.
APPLICATION FILED MAY 31, 1917.
1,269,189.
Patented June 11, 1918.
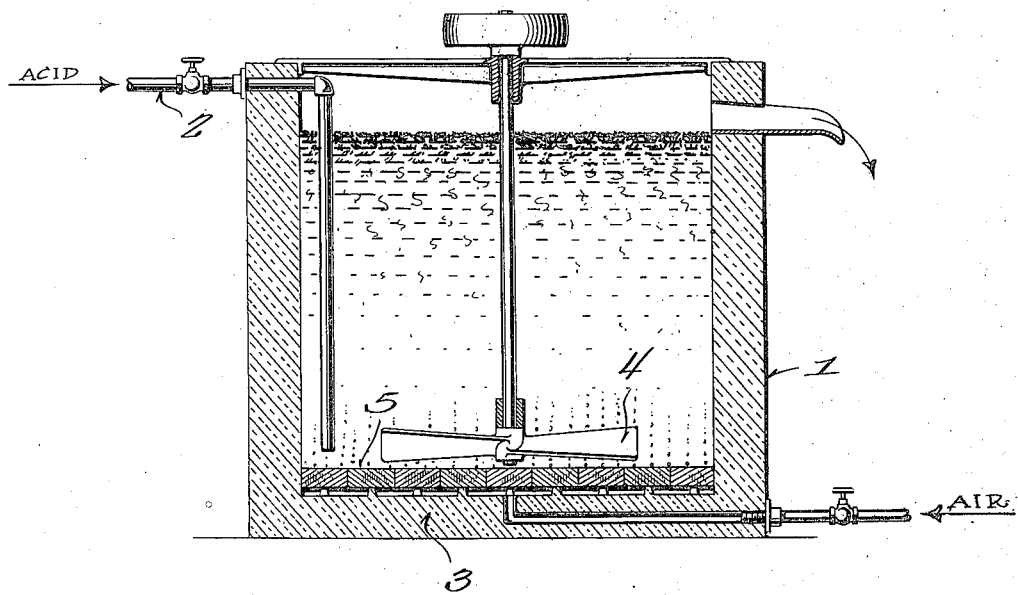

UNITED STATES PATENT OFFICE.

VICTOR H. KADISH, OF MILWAUKEE, WISCONSIN, ASSIGNOR OF ONE-HALF TO HALBERT L. KADISH, OF MILWAUKEE, WISCONSIN.

METHOD OF RECOVERING FERTILIZING MATERIAL FROM TANNERY WASTE LIQUIDS.

1,269,189.     Specification of Letters Patent.     Patented June 11, 1918.

Application filed May 31, 1917. Serial No. 171,805.

*To all whom it may concern:*

Be it known that I, VICTOR H. KADISH, a citizen of the United States, and resident of Milwaukee, in the county of Milwaukee and State of Wisconsin, have invented certain new and useful Improvements in Methods of Recovering Fertilizing Material from Tannery Waste Liquids; and I do hereby declare that the following is a full, clear, and exact description thereof.

My invention relates to a method for the recovery of fertilizer material from the normally waste liquors from tannery processes. It is primarily the object of this invention to remove the usual colloidal matter from the liquors which have been used in preparing hides and skins for tanning and other purposes.

It is more specifically an object to provide a process for readily separating the colloidal matter from the other liquid portion of the waste liquors after such matter has been coagulated or precipitated.

With these general objects in view the invention resides in the improved process hereinafter more particularly described and claimed.

In the accompanying drawing, one method of carrying out my process is illustrated, the figure being a vertical sectional view through a coagulating tank or vat.

It has been found that the waste liquor from tanneries which is produced in the vats where hides are dehaired by the use of sodium sulfid or other chemicals, contains in solution and suspension a material which is made up of valuable fertilizing properties. This material is ordinarily difficult to separate from the more liquid part of the waste liquors. But this separation is very readily carried out by my process which consists primarily in adding a suitable acid to the liquor which comes from the dehairing vats or to such liquor after having been augmented by the addition of other waste liquors produced in the tannery.

A sufficient amount of acid is added to such liquor to neutralize the alkalinity of the same and to render it slightly acid. Any suitable acid may be employed, but those preferably used because of their cheapness are sulfuric or sulfurous.

Upon the addition of such acid in sufficient amounts to cause the liquor to have an acid reaction, the colloidal matter, which is in solution and suspension, is coagulated or rendered precipitant, thus leaving behind a substantially clear water. The separation of such matter from the water is thereafter comparatively simple, but the operation is simplified by the generation of gases in the form of small bubbles.

Referring to the drawing it will be seen that the sulfuric or sulfurous or other acid is added to the liquor in the coagulating tank or vat 1 through a pipe 2 which opens adjacent the bottom 3 thereof. During the addition of the acid the liquor in the tank is suitably agitated by the agitators 4 therein, thereby thoroughly mixing the acid with the other liquid in the tank. The gas bubbles above mentioned are necessarily first generated at the bottom of the tank and naturally rise to the surface of the liquor therein. In rising they attach themselves to the coagulated mass of colloids. These gases thereafter cause the coagulated material to float to the top or the surface of the liquor and thus form a heavy scum.

This scum may thus be very readily separated from the liquid in the tank, for instance by drawing off through a suitable outlet in the wall of the tank 1. After this separation has taken place the matter which is to form the fertilizing material is dried, and is then ready for use. When in this dry state the material is granular and, because of the condition in which it is separated from the liquid portions of the waste liquors, it dries very readily.

Under certain conditions there is an insufficient amount of gas generated by the addition of acid to the liquor, in which case it is advisable to aerate the liquor to produce a quantity of air bubbles to serve the same purpose as bubbles generated by the acid. Any preferred means may be used for diffusing the air bubbles through the liquor, but they are preferably liberated at the bottom of the tank 1 so that they may rise through the liquor and in rising attach themselves to the coagulated colloidal matter. In the accompanying drawing one means is shown for adding the air bubbles to aid the gas bubbles, this means being substantially similar to that shown in the U. S. Patent, #1,208,821, granted Dec. 19, 1916. In this means a false bottom 5 formed of a slab of wood is placed in the tank 1 and spaced from the bottom 3 thereof. Air under pressure is forced into the space between the two bottoms and it works through the pores of the wooden bottom 5 and is thereby subdivided into a multitude of minute bubbles.

By such a method as this a very satisfactory fertilizer is formed as a by-product of the tanning industry, and because of the cheapness of all the necessary reagents, an apparatus for carrying out the process may be inexpensively installed in any tannery.

I claim:

1. The method of recovering fertilizing material from tannery sulfid liquor waste which consists in adding an acid to the liquor in sufficient quantities to neutralize its alkalinity and to precipitate said material, and thereafter separating the precipitated material from the liquid.

2. The method of recovering fertilizing material from tannery sulfid liquor waste which consists in adding sulfurous acid to the liquor in sufficient quantities to neutralize its alkalinity and to precipitate said material, and thereafter separating the precipitated material from the liquid.

3. The method of recovering fertilizing material from tannery sulfid liquor waste which consists in adding a liquid to the liquor to render said fertilizing material coagulative, and thereafter separating said coagulated material from the liquor.

In testimony that I claim the foregoing I have hereunto set my hand at Milwaukee, in the county of Milwaukee and State of Wisconsin.

VICTOR H. KADISH.